(12) United States Patent
Fulkerson

(10) Patent No.: US 9,200,810 B2
(45) Date of Patent: Dec. 1, 2015

(54) FAUX GLOWING FIREWOOD LOG SUITABLE FOR OUTDOOR USE

(71) Applicant: Coleman Cable, LLC, Waukegan, IL (US)

(72) Inventor: Tina M. Fulkerson, Kenosha, WI (US)

(73) Assignee: Coleman Cable, LLC, Waukegan, IL (US)

( * ) Notice: Subject to any disclaimer, the term of this patent is extended or adjusted under 35 U.S.C. 154(b) by 2 days.

(21) Appl. No.: 14/197,941

(22) Filed: Mar. 5, 2014

(65) Prior Publication Data

US 2015/0253013 A1 Sep. 10, 2015

(51) Int. Cl.
*F24C 7/00* (2006.01)
*F21S 9/03* (2006.01)
*F21S 10/04* (2006.01)
*F21Y 101/02* (2006.01)

(52) U.S. Cl.
CPC .............. *F24C 7/004* (2013.01); *F21S 9/037* (2013.01); *F21S 10/04* (2013.01); *F21Y 2101/02* (2013.01)

(58) Field of Classification Search
CPC .................................. F21S 10/04; F24C 7/004
See application file for complete search history.

(56) References Cited

U.S. PATENT DOCUMENTS

| | | | | |
|---|---|---|---|---|
| 1,719,622 A * | 7/1929 | Price | ............................. | 40/428 |
| 1,827,941 A * | 10/1931 | Gross | ............................. | 40/428 |
| 1,840,372 A * | 1/1932 | Staude | ............................. | 40/428 |
| RE24,399 E * | 12/1957 | Brooks | ............................. | 40/428 |
| 3,526,984 A * | 9/1970 | Nielsen et al. | ................... | 40/428 |
| 2003/0161145 A1* | 8/2003 | Liu et al. | ........................ | 362/161 |
| 2006/0101681 A1* | 5/2006 | Hess et al. | ....................... | 40/428 |
| 2008/0004124 A1* | 1/2008 | O'Neill | ............................ | 472/65 |
| 2009/0126241 A1 | 5/2009 | Asofsky | | |
| 2009/0310340 A1* | 12/2009 | Betz et al. | ...................... | 362/183 |
| 2010/0299980 A1* | 12/2010 | Betz et al. | ........................ | 40/428 |
| 2012/0048841 A1* | 3/2012 | Asofsky et al. | ................ | 219/201 |

OTHER PUBLICATIONS

Advertisement for Campfire Kids Campfire product of Insect Lore Corporation of Shafter, California, published by Insect Lore Corporation at http://www.insectlore.com/campfire-kids-campfire at least as early as May 26, 2013.
Fu, Ke Rui, co-pending U.S. Appl. No. 29/484,294, filed Mar. 7, 2014, entitled "Front Face of a Faux Fire Pit Log".

* cited by examiner

*Primary Examiner* — Gary Hoge
(74) *Attorney, Agent, or Firm* — Patzik, Frank & Samotny Ltd.

(57) ABSTRACT

A faux glowing firewood log has an appearance simulating that of a burning or glowing log of natural firewood, and is suitable for outdoor use. The simulated log includes an integral power source comprising a rechargeable battery and a solar panel for charging the battery. A plurality of light emitting diodes, powered by the integral power source, are disposed in spaced relationship within a body of the simulated log. The faux glowing log's body includes a translucent region, and an outer surface including crevices or grooves, simulated knots, simulated tree rings, and simulated tree bark. Light emitted by the diodes is transmitted through the translucent region, including the crevices, giving the appearance simulating that the log is on fire or glowing with heat.

13 Claims, 4 Drawing Sheets

FAUX GLOWING FIREWOOD LOG SUITABLE FOR OUTDOOR USE

BACKGROUND OF THE INVENTION

1. Field of the Invention

The present invention relates, in general, to outdoor fire pits and, more specifically, to a simulated glowing log of firewood, suitable for use in outdoor fire pits and the like.

2. General Background of the Invention

Outdoor fire pits, commonly used in the patios and gardens of residences, have become increasingly popular of late. They range from relatively low cost, portable units, to large units made of concrete, stone or ceramic materials that may be built into an overall patio. While such fire pits are commonly constructed to contain and accommodate burning or glowing logs of natural firewood, homeowners are often reluctant to make frequent use of their fire pits, due to the requirement to store and maintain a ready supply of firewood, kindling and other fire starting materials, and the necessity of the removing and disposing of the ashes that inevitably accumulate as firewood is burned. Moreover, use of conventional firewood results in the emission of pollutants into the air, and may, in the aggregate, contribute to global deforestation.

Accordingly, it is an object of the present invention to provide a simulation of a glowing or burning log of firewood.

It is another object of the present invention to provide a simulation of a glowing or burning log of firewood that is suitable for outdoor use.

It is yet another object of the present invention to provide a simulation of a glowing or burning log of firewood that is a stand-alone, solar-powered unit.

These and other objects and features of the present invention will become apparent in view of the present specification, drawings and claims.

BRIEF SUMMARY OF THE INVENTION

The present invention comprises a faux glowing firewood log. The faux glowing firewood log includes a body having an interior region and an outer surface that includes at least one portion that simulates the appearance of a firewood log. The faux glowing firewood log includes an integral power source, and at least one light source, operably coupled to the integral power source and disposed within the interior region of the body. At least a portion of the light emitted by the at least one light source passes from the interior of the body and through the translucent material of the outer surface of the body, causing the body to emit light, thereby simulating the appearance of a burning firewood log.

The at least one light source comprises at least one light emitting diode and, in a preferred embodiment, comprises two light emitting diodes, disposed in a spaced-apart relationship within the interior region of the body. The integral power source may comprise a solar cell, a battery, or a combination of a solar cell and a rechargeable battery. At least a portion of the solar cell is preferably mounted generally flush with an outer surface of the body. A manually-actuated on/off switch selectively connects and disconnects the light source and supporting electronics from the power source.

The body of the faux glowing firewood log includes a substantially translucent region and at least one substantially opaque region. In a preferred embodiment, two substantially opaque regions are provided, with each of the two substantially opaque regions being disposed on an opposing side of the substantially translucent region. Moreover, a region of gradually changing translucency is disposed proximate a junction of the substantially translucent region and at least one of the at least one substantially opaque region, with gradually reducing translucency in the direction of the at least one substantially opaque region.

DETAILED DESCRIPTION OF THE INVENTION

Figure 1:
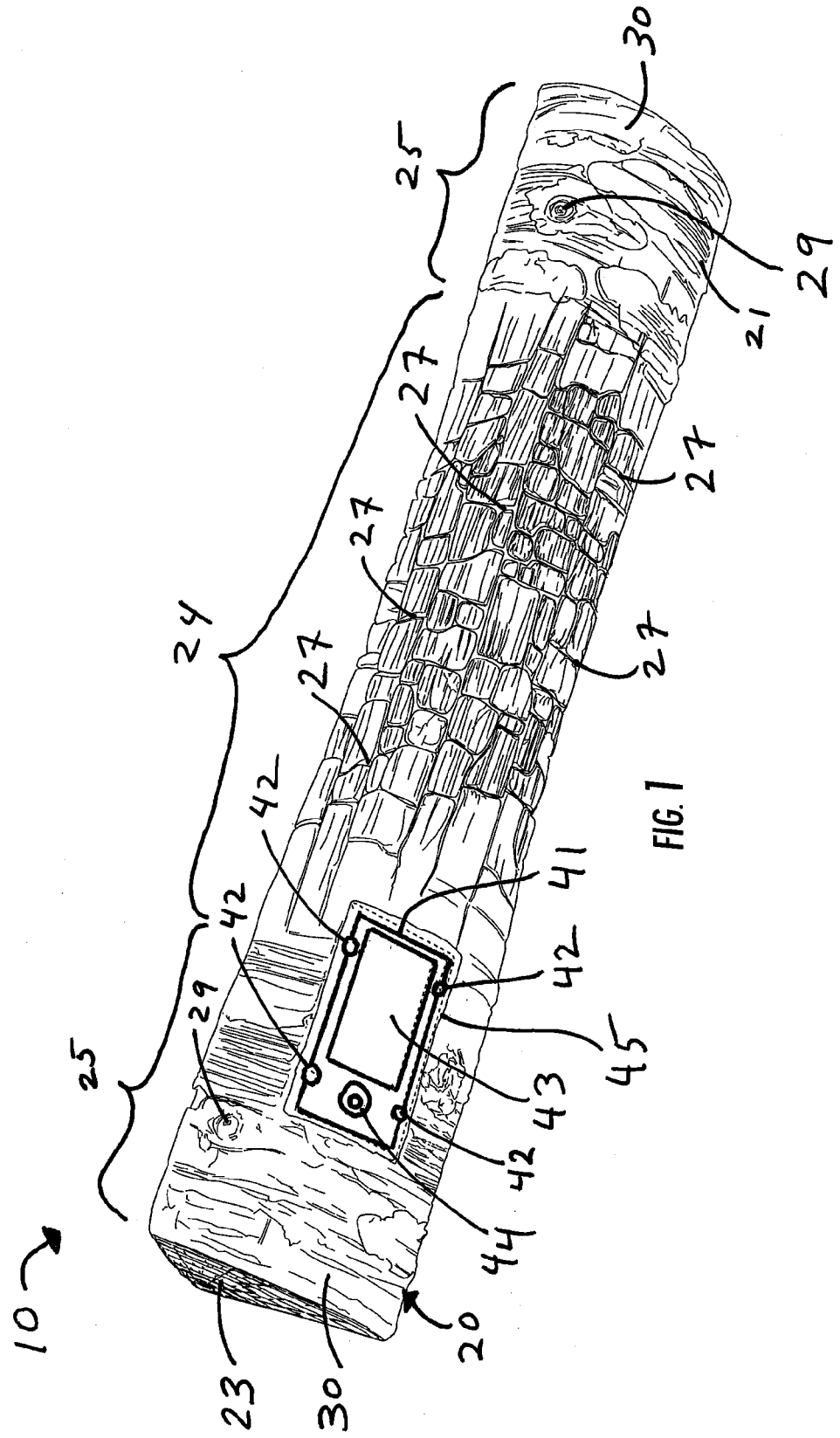
FIG. 1 is an elevated, top perspective view of a faux glowing firewood log of the present invention.

While the present invention is susceptible of embodiment in many different forms, there is shown in the drawings and will herein be described in detail, one specific embodiment, with the understanding that the present disclosure is intended as an exemplification of the principles of the present invention and is not intended to limit the invention to the embodiments illustrated.

Figure 2:
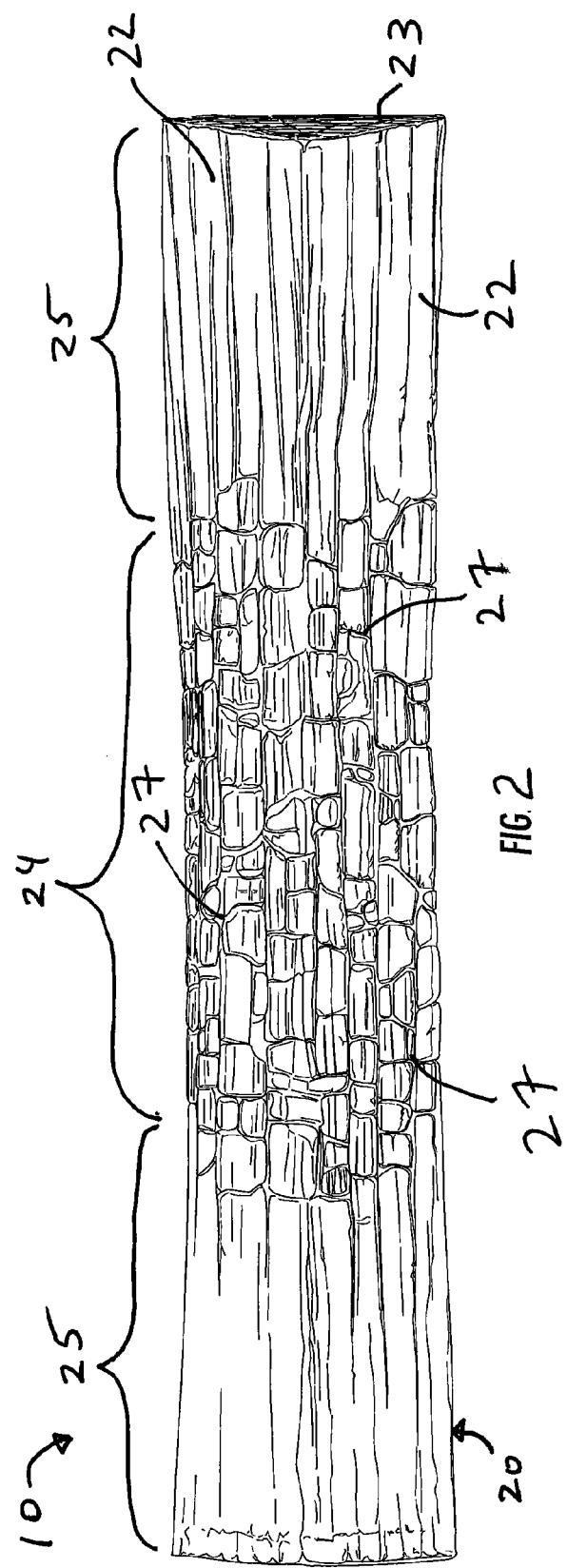
FIG. 2 is a rear view of the faux glowing firewood log of FIG. 1.
Figure 3:
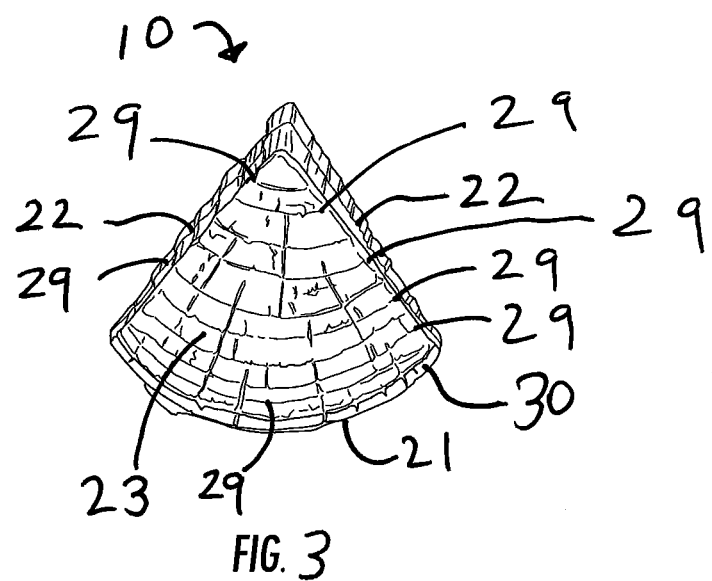
FIG. 3 is a right side view of the faux glowing firewood log of FIG. 1.

Faux glowing firewood log 10 is shown in FIGS. 1-3 as comprising body 20, being generally circular sector-shaped in cross-section and having a convex, generally rectangular front face 21, two relatively flat, generally rectangular rear faces 22, and two relatively flat, generally circular sector-shaped side faces 23. While side faces 23 are substantially opaque, front face 21 and rear faces 22 each include a substantially translucent center region 24, flanked by two opposing substantially opaque regions 25.

Body 20 is preferably constructed of a translucent polyresin material comprising an unsaturated polyester resin, phthalic anhydride, maleic anhydride, phenylethylene, ethylene glycol, and propanediol. The polyresin material is preferably a shade of red in color and has a surface texture simulating the appearance of the surface of a burning log of firewood, including crevices or grooves 27, simulated wood knots 28, simulated tree rings 29, and simulated tree bark 30. A plurality of light sources 54, 55 are disposed within a hollow interior region of body 20 proximate translucent center region 24. As translucent center region 24 is preferably one or more shades of red in color, and crevices 27 are preferably located primarily within translucent center region 24, light emitted by the internal light sources 54, 55 causes a brighter glow to be emitted through crevices 27 than through the surrounding portions of translucent center region 24, as the overall thickness of the polyester resin from which body 20 is constructed is somewhat thinner at crevices 27, permitting more light energy to be emitted therethrough. A substantially opaque paint, coating, or material is applied to front face 21 and rear faces 22 at opaque regions 25, and may be employed to provide a surface of simulated tree bark 30, portraying a region of body 20 that, unlike translucent center region 24, has yet to be significantly consumed by fire. Moreover, a lesser amount of opaque paint, coating, or material may be applied in a gradually changing manner proximate the junctions of translucent center region 24 and opaque regions 25, progressively reducing in thickness towards the center, such that a gradual transition in the illumination emitted through body 20 occurs, with the brightest emission being towards the center, becoming less and less intense towards the ends of body 20.

Front face 21 of body 20 includes a generally rectangular aperture 45 communicating with the hollow interior region of body 20. Electronics housing 40 is disposed through aperture 45 of body 20, and includes faceplate 41 disposed relatively flush with front face 21 of body 20. Four screws 42 removably secure faceplate 41 to electronics housing 40, providing access to a battery compartment therein. Moreover, faceplate 41 includes two apertures, permitting the photovoltaic element of solar cell 43 and the pushbutton portion of single-pole, single-throw ("SPST") on/off switch 44 to be exposed to the exterior of electronics housing 41.

Although, in the embodiment shown in FIGS. 1-3, body 20 has an appearance simulating a log of birch firewood, body 20 may alternatively be configured to simulate the appearance of other types of firewood, such as oak or other hardwoods. Moreover, although, in the embodiment shown in FIGS. 1-3, body 20 is generally triangular or circular sector-shaped in cross-section, other configurations are likewise contemplated, including, without limitation, simulated logs that are generally circular in cross section, and having simulated bark disposed about substantially the entire circumference of body 20; as well as simulated logs that are generally square or rectangular in cross section, and having simulated wood grain, rather than simulated bark, about the majority of all of the faces of body 20.

Figure 4:
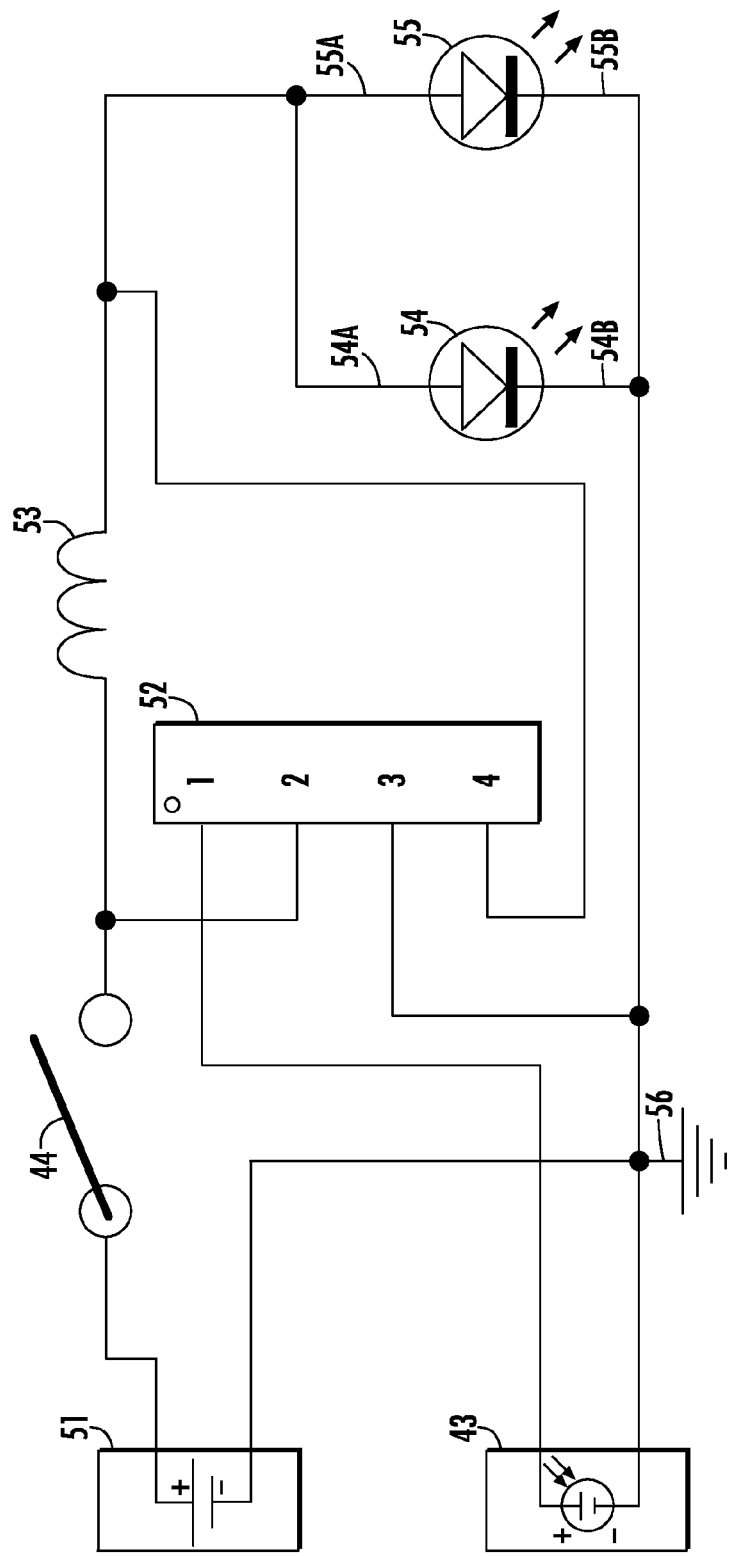
FIG. 4 is a schematic diagram of the electrical circuitry of the faux glowing firewood log of FIG. 1.

Referring to FIG. 4, a schematic 50 of the electronics of the present faux glowing firewood log is shown as comprising solar cell 43, SPST on/off switch 44, power source 51, solar light emitting diode ("LED") driver integrated circuit 52, inductor 53, first LED 54, and second LED 55. Power source 51 is preferably a rechargeable battery, such as a AA-type Nickel-Cadmium battery, producing a nominal voltage of approximately 1.2 volts and storing a maximum of approximately 700 milliamp-hours of energy when fully charged. SPST on/off switch 44 permits the user to manually control the application of power to integrated circuit 52. Solar cell 43 preferably comprises four solar panels wired in series, collectively producing approximately 1.8 volts and a maximum of approximately 100 milliamps of current when exposed to bright sunlight conditions.

Although, in the schematic diagram of FIG. 4, two LED light sources are shown, it is also contemplated that a different quantity of light sources may be employed, such as, for example, between four and ten LEDs or other suitable light sources. Of course, the use of additional light sources may require a corresponding use of additional batteries and/or larger batteries, as well as additional or larger solar cells to recharge the additional or larger batteries.

Moreover, in an alternative embodiment of the invention, on/off switch 44 may be omitted, with the positive terminal of power source 51 being directly connected to both a terminal of inductor 53 and pin 2 of integrated circuit 52. In this embodiment, the faux glowing firewood log may initially be supplied to end users with a nonconductive sheet of material disposed between at least one terminal of a rechargeable battery of power source 51 and an associated terminal of a battery compartment within electronics housing 40. The nonconductive sheet may include a tab or gripping region, which may optionally extend out of body 20, such as through an aperture or along the side edge of faceplate 41. Removal of the nonconductive sheet from the battery compartment, such as by manually drawing the tab away from body 20, causes the battery of power source 51 to be fully electrically coupled to the battery compartment. As a result, faux glowing firewood log 10 enters and remains in a continuous "on" and powered state (so long as the battery of power source 51 remains sufficiently charged by solar cell 43).

Integrated circuit 52 is a four-pin device having a charging controller capable of charging power source 51 from energy supplied by solar cell 43, and an LED drives integrated circuit 52 providing a constant current output voltage in conjunction with inductor 53. Specifically, integrated circuit 52 includes a power metal-oxide-semiconductor field-effect transistor ("MOSFET") that, in conjunction with inductor 53, forms a step-up or boost DC-to-DC power converter, supplying power to LEDs 54 and 55 via wire leads 54A and 54B (for LED 54) and 55A and 55B (for LED 55).

As shown in FIG. 4, pin 1 of integrated circuit 52, which may comprise a CL0119A LED driver manufactured by Chip Link Semiconductor Limited of Hong Kong, China, is coupled to the positive terminal of solar cell 43, with the negative terminal of solar cell 43 being coupled to ground 56. Pin 2 of integrated circuit 52 is coupled to a first terminal of inductor 53 and, via SPST switch 44, to the positive terminal of power source 51, with the negative terminal of power source 51 being coupled to ground 56. Pin 3 of integrated circuit 52 is coupled to ground 56. Pin 4 of integrated circuit 52, which is tied to the drain of a power MOSFET internal to integrated circuit 52, is coupled to a second, opposing terminal of inductor 53, and to the anodes of LEDs 54 and 55 via wire leads 54A and 55A, respectively. The cathodes of LEDs 54 and 55 are coupled to ground 56 via wire leads 54B and 55B, respectively.

In operation, upon the closure of SPST switch 44, when solar energy is supplied to solar cell 43, integrated circuit 52, in turn, employs the electrical power emitted by solar cell 43 to, in turn, charge power source 41. Moreover, integrated circuit 52, in conjunction with inductor 43, provides a higher, stepped-up voltage, at a relatively constant current, to LEDs 54 and 55, causing them to emit a relatively bright light. An ambient light sensor may optionally be provided as a discrete electrical component, extending through faceplate 41 of electronics housing 40, such that LEDs 54 and 55 are only illuminated at nighttime, or whenever the output of the ambient light sensor is above a predetermined threshold. Alternatively, the output of solar cell 43 may employed by integrated circuit 52 as an ambient light sensor, whereby the MOSFET within integrated circuit 52 will only be activated at times when no significant energy is output from solar cell 43. As a result, LEDs 54 and 55 will only be powered at nighttime or during other conditions of darkness or low intensity ambient lighting.

With the exception of LEDs 54 and 55, and wire leads 54A, 54B, 55A and 55B, all of the components of schematic 50 are housed within electronics housing 40, under relatively water and weather-resistant conditions upon the attachment of faceplate 41 to electronics housing 40 via screws 42. Proximate ends of wire leads 54A, 54B, 55A and 55B are disposed within electronics housing 40, which includes four apertures, each allowing the passage of an associated wire lead therethrough in a relatively tight-fitting, water and weather-resistant manner. Wire leads 54A and 54B are substantially equal to each other in length, and wire leads 55A and 55B are substantially equal to each other in length. However, wire leads 55A and 55B are both longer than wire leads 54A and 54B, permitting LED 55 to be positioned within the hollow interior of body 20 at a first distance from electronics housing 40 that is further than a second distance of LED 54 from electronics housing 40. In this manner, LEDs 54 and 55 may be disposed in a spaced relationship, relative to each other, along translucent center region 24 of body 40, thereby providing distributed illumination within the hollow interior of body 20. This, in turn, yields a more evenly distributed exterior illumination through the translucent material of center region 24 to the exterior of body 20, with somewhat brighter illumination where light is emitted through crevices 27, thereby providing a close approximation of the appearance of a log of firewood that is glowing with heat.

Notably, a plurality of such faux glowing firewood logs 10 may be simultaneously placed within an outdoor fire pit, fire grate, or other suitable outdoor location in order to simulate an overall collection, bundle or arrangement of burning firewood logs. Moreover, body 20 may alternatively be configured to simulate a unitary bundle or arrangement of multiple logs, rather an individual log. In such embodiments, portions of the overall body corresponding to individual logs within a unitary simulated faux glowing bundle or arrangement will include one or more light sources disposed within the individual log regions of the overall body, such that each log region appears to be burning or glowing with heat. In such embodiments, a single solar cell may be employed, powering the various light sources throughout the unit, or a plurality of solar cells may be employed, either within one, larger region of body 20 or dispersed about several positions on body 20.

Many modifications and variations of the present invention are possible in light of the above teachings. It is therefore to be understood that within the scope of the appended claims, the invention may be practiced other than as specifically described. Various modifications, changes and variations may be made in the arrangement, operation and details of construction of the invention disclosed herein without departing from the spirit and scope of the invention. The present disclosure is intended to exemplify and not limit the invention.

What is claimed is:

1. A faux glowing fire, comprising:
   a body having an interior region and an outer surface, at least a portion of the outer surface having an appearance simulating the appearance of at least one firewood log, at least a region of the body proximate the interior region being constructed of a substantially translucent material;
   an integral power source carried within the body; wherein the integral power source comprises a solar cell with at least a portion of the solar cell mounted generally flush with an outer surface of the body;
   at least one light source, operably coupled to the integral power source and disposed within the interior region of the body;
   whereby at least a portion of the light emitted by the at least one light source passes from the interior region of the body and through the outer surface of the body, causing the body to emit light, thereby simulating the appearance of at least one burning firewood log.

2. The faux glowing fire according to claim 1, wherein the at least one light source comprises at least one light emitting diode.

3. The faux glowing fire according to claim 1, wherein the at least one light source comprises a plurality of light sources.

4. The faux glowing fire according to claim 3, wherein the plurality of light sources comprises a plurality of light emitting diodes.

5. The faux glowing fire according to claim 3, wherein the plurality of light sources are disposed in a spaced-apart relationship within the interior region of the body.

6. The faux glowing fire according to claim 1, wherein the integral power source further comprises a battery.

7. The faux glowing fire according to claim 1, wherein the integral power source further comprises a rechargeable battery.

8. The faux glowing fire according to claim 1, wherein the body further includes at least one substantially opaque region.

9. The faux glowing fire according to claim 8, wherein the at least one substantially opaque regions comprises two substantially opaque regions, each of the two substantially opaque regions disposed on opposing sides of the substantially translucent region.

10. The faux glowing fire according to claim 8, wherein there is a region of gradually changing transparency of the body proximate a junction of the substantially translucent region and at least one of the at least one substantially opaque region.

11. The faux glowing fire according to claim 1, further comprising an ambient light sensor, the at least one light source being activated only when an output of the ambient light sensor exceeds a predetermined threshold.

12. The faux glowing fire according to claim 1, wherein at least a portion of the body is constructed of a polyresin material.

13. A faux glowing firewood log, comprising:
   a body having an interior region and an outer surface, a substantially translucent region proximate the interior region, two substantially opaque regions disposed on opposing sides of the substantially translucent region, and regions of gradually changing transparency disposed between the substantially opaque regions and the substantially translucent region, at least a portion of the outer surface having an appearance simulating the appearance of a firewood log;
   an integral power source carried within the body, the integral power source comprising the combination of a solar cell and a rechargeable battery with at least a portion of the solar cell mounted generally flush with an outer surface of the body;
   at least one light source, operably coupled to the integral power source and disposed within the interior region of the body;
   whereby at least a portion of the light emitted by the at least one light source passes from the interior region of the body and through the outer surface of the body, causing the body to emit light, thereby simulating the appearance of a burning firewood log.

\* \* \* \* \*